United States Patent [19]

Lawhon

[11] Patent Number: 4,819,531

[45] Date of Patent: Apr. 11, 1989

[54] CUTTING APPARATUS AND METHOD FOR SEPARATING A VEHICLE GLAZING SEAM

[76] Inventor: Stephen C. Lawhon, 916 N. 19th St., St. Joseph, Mo. 64501

[21] Appl. No.: 107,024

[22] Filed: Oct. 9, 1987

[51] Int. Cl.⁴ .................. B26D 3/00; B26D 3/10; B26B 7/00

[52] U.S. Cl. .................. 83/56; 30/272 R; 30/314

[58] Field of Search .......... 30/272 R, 296 R, 314, 30/317; 83/745, 56; 7/100, 158; 254/218, 223, 369, 376

[56] References Cited

U.S. PATENT DOCUMENTS

| | | |
|---|---|---|
| 1,836,396 | 12/1931 | Ridgely . |
| 2,674,005 | 4/1954 | Simon . |
| 2,746,452 | 5/1956 | Saylors ............................ 30/92.5 |
| 2,896,322 | 7/1959 | Vose ............................... 30/92.5 |
| 3,924,327 | 12/1975 | Edwards . |
| 4,080,734 | 3/1978 | Barbour . |
| 4,215,475 | 8/1980 | Morford et al. . |
| 4,315,450 | 2/1982 | Pray ................................. 83/745 |
| 4,395,825 | 8/1983 | Lock . |
| 4,452,316 | 6/1984 | Edwards . |
| 4,543,720 | 10/1985 | Grunikiewicz et al. . |

Primary Examiner—Donald R. Schran
Assistant Examiner—Scott A. Smith
Attorney, Agent, or Firm—Litman McMahon & Brown

[57] ABSTRACT

A cutting tool includes a blade assembly with a blade mounted on a handle. A winch assembly is connected to the blade assembly and includes a cable wound on a drum. The drum is advanced by a drive ratchet subassembly and is connected at its free end to a hook. A method of separating a seam with the cutting tool includes the steps of anchoring the cable, inserting the blade in the seam and retracting the cable with respect to the blade whereby the blade is advanced through the seam.

19 Claims, 2 Drawing Sheets

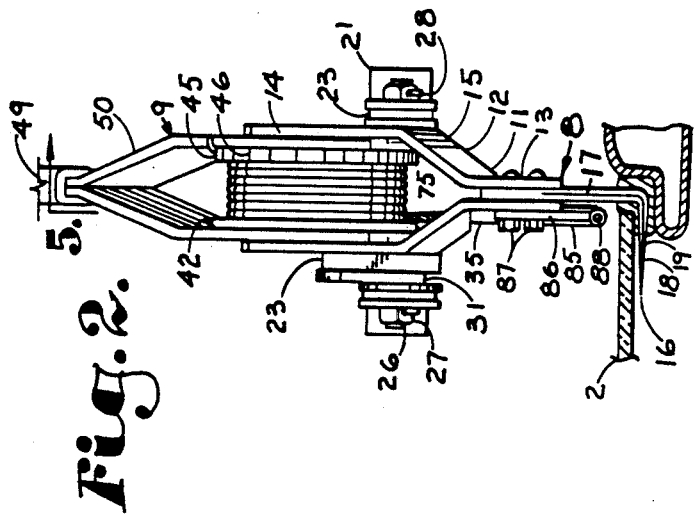
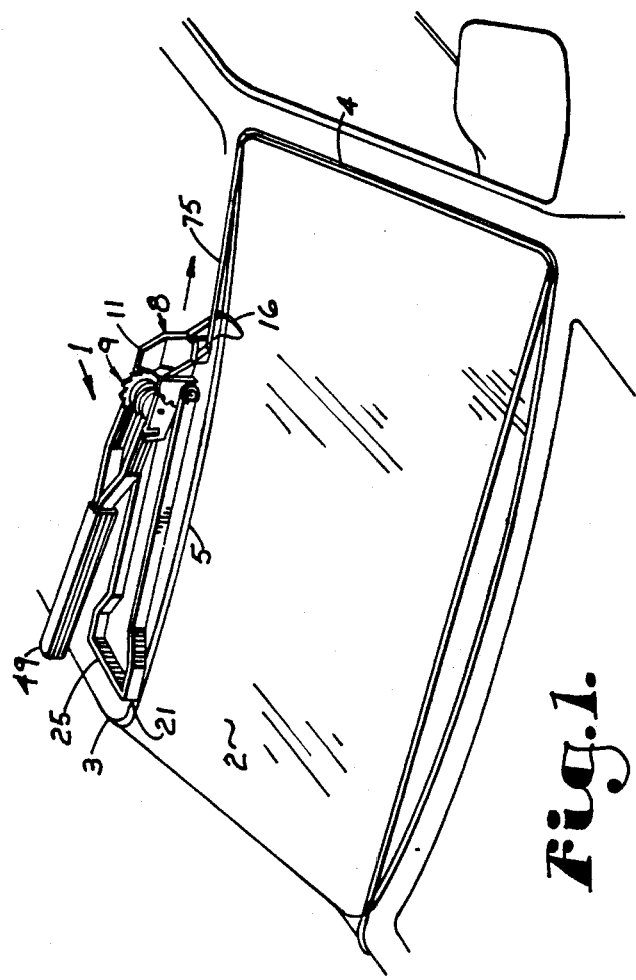
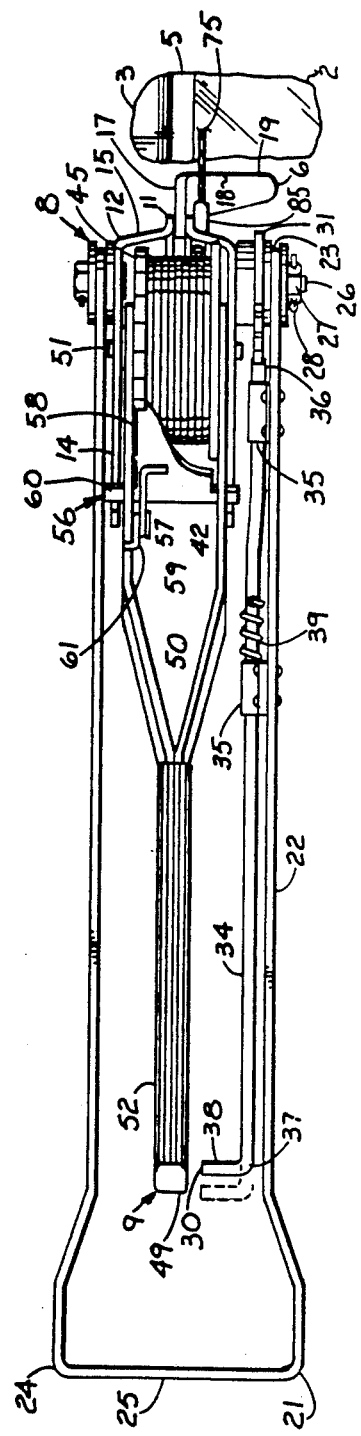

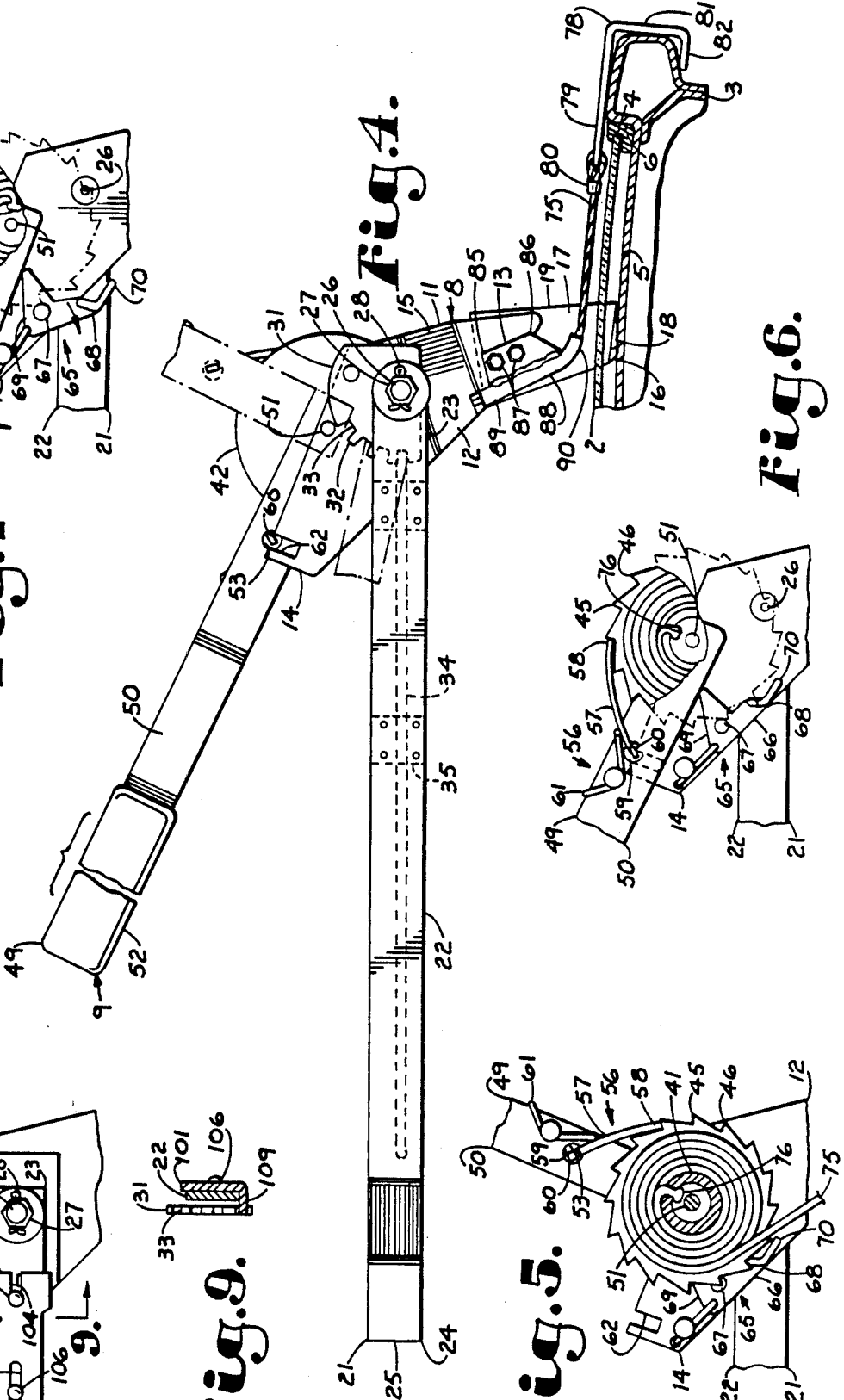

CUTTING APPARATUS AND METHOD FOR SEPARATING A VEHICLE GLAZING SEAM

BACKGROUND OF THE INVENTION

1. Field of the Invention.

The present invention relates generally to cutting tools, and in particular to a tool and method for separating a vehicle glazing seam.

2. Description of the Prior Art.

Fixed vehicle glazing, especially automobile windshields and rear windows, is typically secured in place with bonding or gasket material forming a bead or seam between the glazing and the vehicle body. Exemplary bonding materials include rubber, urethane, epoxy, silicone, etc. The bonding material generally forms a seam between a perimeter of the glazing and a frame (sometimes referred to as a "fence") defined by the vehicle body.

Glazing sometimes has to be removed for replacement, salvage or resealing. It may be acceptable to destroy damaged glazing in the process of removing it for replacement, but for salvage and resealing operations the glazing must be removed intact and undamaged. Removal of glazing generally requires separation of its bonding material seam.

A variety of devices and methods have heretofore been proposed for separating vehicle glazing seams. For example, the Barber U.S. Pat. No. 4,080,734 discloses a method and percussion tool for removing a vehicle windshield. The tool includes wing portions with blades projecting therefrom to define L-shaped cutting edges for separating a bonding material seam. A pneumatic tool holder or a hammer provides blows for advancing the Barber tool, but the blows can damage the glazing. Seam cutting devices driven by reciprocating power tools are disclosed in the Edwards U.S. Pat. No. 3,924,327 and the Lock U.S. Pat. No. 4,395,825.

It has also been proposed to mount blades specially designed for separating bonding material on oscillating power tools. For examples, see the Morford et al. U.S. Pat. No. 4,215,475 and the Grunikiewicz et al. U.S. Pat. No. 4,543,720. The Morford et al. tool includes a handle mounted on a cable for pulling the tool around the perimeter of a glazing pane to be removed.

Other prior art devices include heated blades, or "hot knives", for melting the bonding material of the glazing seam. Such tools are available from the Pittsburg Plate Glass Company (PPG) in Pittsburg, Pa. under the trademark SWIV-L-CUT. Although a cutting tool hot enough to melt the bonding material can facilitate removal of the glazing pane, damage to the vehicle can result from scorching. Also, the different melting temperatures of various bonding materials tend to limit the usefulness of particular hot knives to only the bonding materials that they were designed for.

Yet another technique for removing glazing panels involves stringing a thin wire through the bonding material seam and pulling it around the perimeter of the glazing. This procedure generally requires two workers to guide and pull the wire, one on the inside of the vehicle and the other on the outside.

The prior art tools and methods for separating glazing seams tended to be cumbersome, tedious, labor intensive and limited in their application to relatively few bonding materials. Furthermore, many of the prior art cutting tools and methods were destructive of the glazing. Heretofore there has not been available a cutting tool and method with the advantages and features of the present invention.

SUMMARY OF THE INVENTION

In the practice of the present invention, a cutting tool and method are provided which are particularly useful for separating a vehicle glazing seam. The cutting tool includes a blade assembly with a blade clevis mounting a right-angled blade. A handle clevis is connected to the blade clevis and is pivotable with respect thereto between different working positions. A winch assembly is mounted on the blade assembly and includes a drum on which a cable is wound. A drive ratchet subassembly is provided for winding the cable on the drum and includes a winch lever. A non-reverse ratchet subassembly is provided for selectively preventing reverse rotation of the drum. A method of separating a seam with the cutting tool is provided wherein the blade is inserted in the seam and the cable is retracted to advance the cutting tool and separate the seam with the blade. The cable can be looped around the perimeter seam of an object, such as a windshield, whereby the tool will be advanced around the object perimeter as the cable is retracted.

OBJECTS OF THE INVENTION

The principle objects of the present invention are: to provide a cutting tool; to provide such a cutting tool which is particularly adapted for separating vehicle glazing seams; to provide such a cutting tool which is adapted to separate seams comprising a variety of bonding materials; to provide such a cutting tool which can be operated by one person; to provide such a cutting tool which can be used to remove the glazing from a variety of vehicles; to provide such a cutting tool which minimizes the likelihood of damage to a piece of glazing being removed; to provide such a cutting tool which can be adjusted to various operating configurations to accomodate different operating conditions; to provide such a cutting tool which is economical to manufacture, efficient in operation, capable of a long operating life and particularly well adapted for the proposed uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a cutting tool embodying the present invention, shown removing a windshield according to a method of the present invention.

FIG. 2 is a fragmentary front elevation of the cutting tool with a glazing seam shown being separated in cross-section.

FIG. 3 is a top plan view of the cutting tool.

FIG. 4 is a side elevation of the cutting tool, shown hooked to a vehicle body.

FIG. 5 is an enlarged, fragmentary, vertical cross-sectional view of the cutting tool taken generally along line 5—5 in FIG. 2 and showing a lever thereof raised and pawls thereof engaged on a ratchet wheel.

FIG. 6 is an enlarged, fragmentary, vertical cross-sectional view of the cutting tool taken generally along line 6—6 in FIG. 3 and showing the lever lowered.

FIG. 7 is an enlarged, fragmentary, vertical cross-sectional view of the cutting tool showing the pawls thereof disengaged.

FIG. 8 is an enlarged, fragmentary, side elevational view of the cutting tool showing a modified slide lock thereof.

FIG. 9 is an enlarged, fragmentary, cross-sectional view of the cutting tool taken generally along line 9—9 in FIG. 8 and showing the modified slide lock.

DETAILED DESCRIPTION OF THE INVENTION

I. Introduction

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a cutting tool embodying the present invention. Without limitation on the generality of useful applications thereof, the tool 1 is particularly designed for removing vehicle glazing, such as a windshield 2 of an automobile 3. The windshield 2 includes a margin 4 imbedded in a bonding material seam 5 in a vehicle frame recess 6. The tool 1 generally comprises a blade assembly 8 for separating the seam 5 and a winch assembly 9 for advancing the blade assembly 8.

II. Blade Assembly

The blade assembly 8 includes a blade clevis 11 comprising a pair of side plates 12 positioned in parallel, spaced-apart relation. Each side plate 12 has a lower section 13 and an upper section 14 interconnected by a transition section 15. The transition sections 15 converge downwardly as shown in FIG. 2 whereby the lower sections 13 are juxtaposed in relatively close-spaced relation and fixedly receive a blade 16 therebetween. The blade 16 is bent at a right dihedral angle to form a vertical leg 17, which is secured between the side plate lower sections 13, and a laterally projecting horizontal leg 18. A cutting edge 19 extends along the blade vertical and horizontal legs 17, 18 at the front of the blade 16.

A handle clevis 21 includes arms 22 with proximate or front ends 23 and distal or back ends 24. The arms 22 are interconnected at their back ends 24 by a handle section 25. At its front end 23 each arm 22 is pivotally connected to a respective blade clevis upper section 14 by a handle bolt 26 receiving a nut 27 with a cotter key 28. A handle lock plate 31 is fixedly mounted between a respective handle arm front end 23 and a respective blade clevis upper section 14. The handle lock plate 31 includes a radius edge 32 forming an arc centered on a pivotal axis extending through the handle bolts 26. The radius edge 32 includes a plurality of spaced notches 33. A handle lock rod 34 is slidably mounted on the inside of a handle arm 22 by tubular rod guides 35 and includes a front end 36 receivable in the notches 33 and a back end 37 bent at a right angle to form a finger trigger 38.

The handle lock rod 34 is biased forwardly into the notches 33 by a return spring 39.

III. Winch Assembly

The winch assembly 9 includes a transversely extending cable drum 41 with a disk 42 mounted at one end and a ratchet wheel 45 including teeth 46 mounted at the other end. A winch lever clevis 49 includes a pair of spaced arms 50 positioned outside the disk 42 and the ratchet wheel 45 respectively. The cable drum 41 is pivotally mounted between the winch lever arms 50 by a winch axle bolt 51 extending coaxially therethrough. The winch lever 49 includes a rear handle section 52 whereat the winch lever arms 50 converge. A pair of drive ratchet receivers 53 are provided in the winch lever arms 50 in transversely opposed, spaced relationship.

A drive ratchet subassembly 56 is mounted on the winch lever 49 for selective engagement with the ratchet wheel 45. A drive ratchet pawl 57 includes a front end 58 selectively engagable with the ratchet wheel teeth 46 and a back end 59 having a pair of laterally projecting tabs 60 each received in a respective drive ratchet receiver 53. A drive ratchet return spring 61 is mounted on a winch lever arm 50 and engages the drive ratchet pawl 57 for biasing it in a clockwise direction as viewed in FIGS. 5 and 6, i.e. into engagement with the ratchet wheel teeth 46.

Each blade clevis upper section 14 includes an upwardly open pawl tab slot 62 for selectively receiving a respective pawl tab 60 when the winch lever 49 is in its lowermost position as shown in FIG. 7. The pawl tabs 60 are slightly wider than the pawl tab slots 62 so that the pawl 57 is automatically rotated rearwardly when the pawl tabs 60 enter the pawl tab slots 62. When they are positioned in the pawl tab slots 62, the tabs 60 prevent the pawl 57 from rotating forwardly into engagement with the ratchet wheel 45.

A non-reverse ratchet subassembly 65 is mounted on the blade clevis upper section 14 that the ratchet wheel 45 is mounted adjacent to and includes a non-reverse pawl 66 pivotally secured to the blade clevis upper section 14 by a suitable mechanical fastener 67.

The pawl 66 includes front and back ends 68, 69. A dog 70 projects laterally from the pawl front end 68 and is adapted for selectively engaging the ratchet wheel teeth 46. An upper projection 71 is positioned in front of the mechanical fastener 67 and is selectively impinged upon by a respective winch lever arm 50. When the winch lever 49 is moved to its release position (FIG. 7), the respective winch lever arm 50 impinges upon the upper projection 71 and rotates the non-reverse pawl 66 in a clockwise direction (as viewed in FIG. 7) whereby the dog 70 is disengaged from the ratchet wheel teeth 46. Since the drive ratchet pawl 57 is also disengaged when the winch lever 49 is in its release position, the cable drum 41 can freewheel in either direction.

The winch assembly 9 includes a cable 75 with a proximate end 76 secured to the cable drum 41 and a hook or distal end 77 secured to a hook 78. The cable 75 preferably comprises high-strength stainless steel, but various other flexible, tensile members could be used. The hook 78 is J-shaped and includes a proximate leg 79 to which the cable hook end 77 is attached by a swage 80, a transition leg 81 extending in a direction normal to the proximate leg 79, and a distal leg 82 extending in a direction normal to the transition leg 81 and parallel to the proximate leg 79.

A cable guide 85 includes a mounting plate 86 secured to the lower section 13 of a respective blade clevis side plate 12 by screws 87. The cable guide 85 also includes a tube 88 with a straight upper portion 89 and a forwardly-curving lower portion 90.

IV. Operation

In the practice of the method of the present invention for removing the windshield 2, the hook 78 is secured to a part of the automobile 3, for example a door hinge (not shown). With the winch lever 49 in its release position (FIG. 7), the cable 75 is played out a sufficient length to substantially encircle the windshield 2. The corners of the windshield 2 are then exposed by prying them loose from the bonding material seam 5 with, for example, a screw driver, knife or a chisel. The cable 75 is then placed under the exposed corners of the windshield 2 and is laid over the windshield 2 or bonding material seam 5 between the windshield corners. It is not necessary that the cable follow the bonding material seam 5 exactly. As shown in FIG. 1, the cable tends to follow the shortest route between the corners, whereas the windshield bonding material seam 5 may have a curvature as shown in the lower part of FIG. 1.

With the cable 75 in place, the windshield margin 4 is separated from the bonding material seam 5 at a starting location. Generally the tool 1 will be started at or near the corner closest to where the cable hook 78 is anchored. At the starting point the blade 16 is placed in the bonding material seam 5 as shown in FIG. 2. The blade 16 will effectively separate bonding material seams 5 of various configurations and materials. The blade horizontal leg 18 extends towards the interior of the windshield 2.

Preferably the operator grasps the handle section 25 with one hand and manipulates the winch lever handle 52 with his or her other hand. Moving the winch lever 49 in a clockwise direction as viewed in FIG. 4 retracts the cable 75 and advances the tool 1. Counterclockwise movement of the winch lever 49 returns it for another advance, cutting stroke. During the winch lever 49 return stroke the cable drum 41 is prevented from rotating counterclockwise (as viewed in FIG. 5) by the non-reverse ratchet subassembly 65. As the tool 1 advances and separates the bonding material seam 5, the operator guides it around the windshield margin 4. At its corners, the windshield 2 has preferably already been separated from the bonding material seam 5 by the cable 75. The tool 1 is primarily used to separate the bonding material seam 5 between the pre-separated corners of the windshield 5 (preferably). If necessary during the cutting operation, the hook 78 can be repositioned.

The handle clevis 21 may be pre-positioned with respect to the blade assembly 8 by pulling back on the finger trigger 38 of the handle lock rod 34 to disengage the rod front end 36 from the handle lock plate 31. Upon releasing the finger trigger 38, the handle lock rod 34 is biased forwardedly by the return spring 39 so that the rod front end 36 can be inserted into a different notch 33. Thus, the handle clevis 21 can be placed in the position that is most advantageous to the use of the cutting tool 1.

V. Modified Embodiment

A modified embodiment of the cutting tool comprising the present invention is shown in FIGS. 8 and 9 and includes a modified handle lock slide 101 with front and back ends 102, 103. The handle lock slide front and back ends 102, 103 include front and back slots 104, 105 which slidably receive rivets 106 secured to a respective handle clevis arm 22. At the handle lock slide front end 102, a detent 109 projects inwardly and is selectively receivable in the handle lock plate notches 33. At the handle lock slide back end 103 an outwardly-projecting finger trigger 110 is provided. The handle lock slide 101 is biased forwardly by a return spring 111 connected to it and to the handle clevis arm 22.

It is to be understood that while certain forms of the present invention have been illustrated and described herein, it is not to be limited to the specific forms or arrangement of parts described and shown.

What is claimed and desired to be secured by Letters Patent is as follows:

1. A cutting tool, which comprises:
   (a) a blade assembly including:
      (1) a blade with a cutting edge; and
      (2) a handle connected to said blade; and
   (b) a winch assembly rigidly connected to said blade assembly and including:
      (1) a flexible tensile member including proximate and distal ends;
      (2) tensile member retraction means connected to said tensile member proximate end and adapted for retracting said tensile member whereby said tool is advanced; and
      (3) attachment means adapted for attaching said tensile member distal end.

2. The tool according to claim 1 wherein said blade assembly includes:
   (a) a blade clevis having a pair of side plates, each side plate including upper and lower sections;
   (b) said blade mounted between said side plate lower sections; and
   (c) said handle being a clevis including a pair of arms each connected to a respective blade clevis side plate upper section and a handle section interconnecting the arms.

3. The cutting tool according to claim 2, which includes:
   (a) said handle clevis arms being pivotally connected to said blade clevis side plate upper sections.

4. The cutting tool according to claim 3, which includes:
   (a) a handle lock plate fixedly mounted on one of said blade clevis side plate upper sections and including a radius edge with a plurality of notches; and
   (b) a handle detent rod including an end selectively receivable in said notches whereby said handle may be locked in various positions with respect to said blade assembly.

5. The cutting tool according to claim 1 wherein:
   (a) said blade includes a vertical leg and a horizontal leg projecting laterally therefrom, said cutting edge extending along said vertical and horizontal legs.

6. The cutting tool according to claim 1 wherein said winch assembly includes:
   (a) a drum for said flexible member; and
   (b) means for rotating said drum.

7. The cutting tool according to claim 6 wherein said drum rotating means comprises:
   (a) a ratchet wheel with perimeter teeth mounted on said drum;
   (b) a winch lever pivotally connected to said blade assembly; and
   (c) a drive ratchet subassembly mounted on said winch lever and adapted to engage said ratchet wheel.

8. The cutting tool according to claim 7 wherein said drive ratchet subassembly includes:
(a) a pawl pivotally mounted on said winch lever and adapted for selectively engaging said ratchet wheel teeth; and
(b) a drive ratchet return spring engaging said drive ratchet pawl and said winch lever for biasing said pawl into engagement with said ratchet wheel teeth.

9. The cutting tool according to claim 7, which includes:
(a) a non-reverse ratchet subassembly connected to said blade assembly and adapted to engage said ratchet wheel, said non-reverse ratchet subassembly being adapted to prevent reverse rotation of said drum.

10. The cutting tool according to claim 1 wherein:
(a) said flexible member comprises a cable.

11. The cutting tool according to claim 1 wherein:
(a) said flexible member attachment means comprises a hook.

12. A cutting tool, which comprises:
(a) a blade assembly including:
   (1) a blade clevis having a pair of side plates, each side plate including upper and lower sections;
   (2) a blade including a vertical leg mounted between said blade clevis side plate lower sections and a horizontal leg, said blade having a cutting edge extending along said vertical and horizontal legs;
   (3) a handle clevis including a pair of arms, each arm having a proximate end and a distal end, and a handle section interconnecting said arms at their distal ends;
   (4) each said arm proximate end being pivotally connected to a respective blade clevis side plate upper section; and
   (5) a handle detent subassembly including a handle lock plate mounted on a respective blade clevis side plate upper section and a handle detent member adapted to selectively engage said handle lock plate whereby said handle clevis is adapted for locking in various positions with respect to said blade clevis; and
(b) a winch assembly including:
   (1) a cable drum extending between and pivotally connected to said blade clevis side plate upper sections;
   (2) a ratchet wheel mounted on said cable drum and including perimeter teeth;
   (3) a winch lever including a pair of arms each pivotally connected to a respective blade clevis side plate upper section;
   (4) a drive ratchet subassembly including a drive ratchet pawl pivotally mounted on and extending between said winch lever arms and adapted for selective engagement with said ratchet wheel teeth;
   (5) a non-reverse ratchet subassembly including a non-reverse ratchet pawl pivotally mounted on a respective blade clevis side plate upper section and adapted for selective engagement with said ratchet wheel teeth whereby reverse rotation of said ratchet wheel is prevented;
   (6) a cable including a proximate end connected to said drum and a distal end;
   (7) a hook mounted on said distal end; and
   (8) a cable guide including a mounting plate attached to a respective blade clevis side plate lower section and a tube connected to said mounting plate, said tube slidably receiving said cable.

13. The cutting tool according to claim 12, which includes:
(a) each said blade clevis side plate upper section including a respective upwardly-open pawl tab slot;
(b) said drive ratchet pawl including a back end with a pair of tabs each rotatably received in a respective winch lever arm drive ratchet receiver, each said tab projecting outwardly from a respective winch lever arm; and
(c) each said tab having a width greater than the width of a respective pawl tab slot and being receivable therein whereby said pawl tab is moved from a position engaged with said drive wheel teeth to a position disengaged therefrom when said pawl tabs are placed in said pawl tab slots.

14. The cutting tool according to claim 12, wherein:
(a) said non-reverse ratchet subassembly includes a laterally projecting dog selectively engagable with said ratchet wheel teeth and an upwardly-extending projection selectively engagable with a respective winch lever arm with said winch lever in its release position.

15. A method of separating a seam with a cutting tool including a blade rigidly connected to a winch and a cable, which comprises the steps of:
(a) anchoring the cable with the cutting tool in proximity to the seam;
(b) inserting the blade in said seam; and
(c) operating said winch to retract said cable to advance said winch and blade whereby said blade is advanced through said seam.

16. The method according to claim 15, which includes the additional step of:
(a) placing said cable under a corner formed by said seam.

17. The method according to claim 15, which includes the additional steps of:
(a) partially encircling a respective object secured by said seam with said cable; and
(b) advancing said blade around said object by retracting said cable.

18. The method according to claim 15, which includes the additional steps of:
(a) providing said cable with a hook; and
(b) anchoring said cable with said hook.

19. The method according to claim 15, which includes the additional step of:
(a) guiding said blade with a handle.

* * * * *